United States Patent [19]

Anthony

[11] Patent Number: 4,900,508
[45] Date of Patent: Feb. 13, 1990

[54] HIGH STRENGTH NUCLEAR FUEL GRID
[75] Inventor: Andrew J. Anthony, Tariffville, Conn.
[73] Assignee: Combustion Engineering, Inc., Windsor, Conn.
[21] Appl. No.: 685,415
[22] Filed: Dec. 24, 1984
[51] Int. Cl.[4] ................................................ G21C 3/34
[52] U.S. Cl. .................................... 376/438; 376/441; 376/462
[58] Field of Search ............... 376/438, 439, 441, 442, 376/462

[56] References Cited
U.S. PATENT DOCUMENTS 3,177,121  4/1965  Horowitz et al. .................... 376/462
4,426,355  1/1984  Burger ................................. 376/442

FOREIGN PATENT DOCUMENTS 54-39785  3/1979  Japan ..................................... 376/438

Primary Examiner—Deborah L. Kyle
Assistant Examiner—Richard W. Wendtland
Attorney, Agent, or Firm—John H. Mulholland

[57] ABSTRACT

An improved nuclear fuel assembly (10) of the type having a plurality of intersecting metal strips (14) welded at the strip intersections (32). At least some of the strips (16a, 18a) have nonlinear upper or lower edges (32a, 44a) at the intersections such that some of the intersection welds (34) at the strip upper or lower edges are at different elevations (34b) relative to intersection welds at other upper or lower edges (34a, 34c, 34d).

5 Claims, 4 Drawing Sheets

HIGH STRENGTH NUCLEAR FUEL GRID

BACKGROUND OF THE INVENTION

This invention relates to nuclear reactor fuel assemblies, and in particular to fuel assembly grids for pressurized water nuclear reactors.

Fuel assembly grids for commercial pressurized water nuclear reactors have conventionally been fabricated by welding together a plurality of perpendicularly oriented metal strips at slotted intersections, to form a rigid, egg-crate structure for spacing and supporting nuclear fuel rods passing therethrough. When such fuel assemblies are designed for use in nuclear reactors located in areas subject to high seismic activity, the grids must be strengthened to carry a higher impact load without causing damage to the grid or the fuel rods. Often, such strengthening includes providing larger welds at all the strip intersections. These larger welds not only strengthen the assembly, but have an effect on the coolant flow characteristics through the grid. The larger welds increase the coolant pressure drop across the assembly, since the flow area of each cell defined by the intersecting strips, is reduced at the elevations containing the welds.

Particularly when fuel assemblies of one design are to be inserted into a reactor core containing fuel assemblies of a different design, the grid strength and pressure drop flow characteristics must be compatible. For example, fuel assemblies made from Inconel 718 are considerably stronger than assemblies made from Zircaloy. Although Zircaloy is not as strong as Inconel 718, it absorbs fewer neutrons and accordingly has operating cost advantages. Circumstances can arise where a reactor core containing fuel assemblies of the Inconel 718 type, is to be refueled with a batch of the Zircaloy type, such that after refueling, both types of assemblies will reside in the core. In order to assure that the reactor core can be safely operated at its maxiumum rated power level with the mixed fuel, the fuel supplier must increase the strength of the Zircaloy assemblies while matching the pressure characteristics of the Inconel 718 assemblies.

SUMMARY OF THE INVENTION

Accordingly, it is an object of the present invention to provide a means by which the strength of a conventional fuel assembly may be increased, without significantly increasing the resistance to fluid flow across the assembly. This is accomplished by modifying the grid structure of the assembly such that the welds at each of the grid strip intersections, are staggered at the entrance and exit of each flow channel or cell of the grid. In the various embodiments illustrated herein below, this staggering ranges from one out of four welds being located in a different plane or elevation from the others at any cell exit or extrance, to other embodiments in which each of the four welds at the cell entrance or exit, is at a different elevation.

In its broadest form, the invention is directed to an improved nuclear fuel assembly of the type having a plurality of intersecting metal strips welded at the strip intersections. At least some of the strips have nonlinear upper or lower edges at the intersections such that some of the intersection welds at the strip upper or lower edges are at different elevations relative to intersection welds at other upper or lower edges.

In a more particular form, the present invention is directed to a nuclear fuel assembly grid comprising a plurality of elongated intersecting strips rigidly joined to form rows and columns of vertically oriented cells. Each cell has generally square entry and exit openings defining a flow channel. At least one of the upper or lower edges of each strip has a plurality of spaced apart slots, each slot fitting into a mating slot on a perpendicular strip such that at each strip intersection, the upper and lower edges of the intersecting strips are at substantially the same elevation to form a cell corner. The grid structural welds are located at such cell corners, but at least one of the four corners of an opening is at a different elevation from the other three. This results from all strips oriented in one, e.g., row, direction having at least one non-linear upper or lower edge, and all the strips oriented in the transverse, e.g., column direction having (in one embodiment) straight upper and lower edges, (and in other embodiments) at least one non-linear lower or upper edge.

The non-linear edge of the grid strips may be saw-toothed, with the maxima and minima of the toothed portions coinciding with a cell corner.

BRIEF DESCRIPTION OF THE DRAWINGS

The preferred embodiments of the present invention, and the best mode for carrying them out, will be set forth in detail herein below, with reference to the accompanying drawings, in which.

DESCRIPTION OF THE PREFERRED EMBODIMENT

Figure 1:
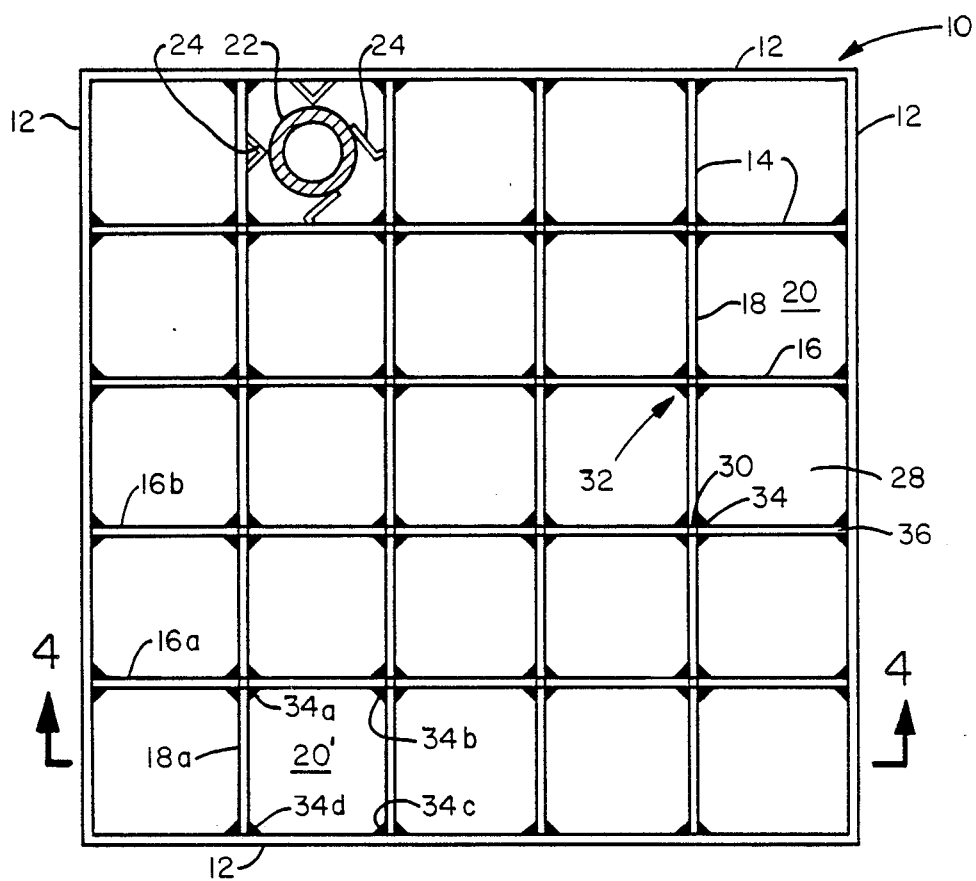
FIG. 1 is a schematic plan view of a nuclear fuel assembly grid for a pressurized water reactor, in accordance with the present invention.

FIG. 1 is a plan view of a grid 10 for a nuclear fuel assembly in accordance with the present invention, showing features commonly employed in pressurized water reactors and as typified in, for example, U.S. Pat. No. 4,426,355 "Spacer Grid for Nuclear Fuel Assembly", U.S. Pat. No. 3,769,159 "Fuel Element Grid Support for Nuclear Reactor", and U.S. Pat. No. 3,423,287 "Nuclear Reactor Fuel Element Support", the disclosures of which are hereby incorporated by reference. The grid includes four perimeters plates 12 welded together to provide an outer frame within which a plurality of flat, relatively thin grid strips 14 preferably a Zircaloy, are arranged in rows 16 and columns 18 to define rows and columns of cells 20. All or most of the cells are adapted to receive a fuel rod 22 passing vertically therethrough (only one shown), and supported therein by springs, arches, or other structural means 24 formed onto or connected to the strips 14 and projecting into the cells 20.

Each cell 20 generally has four internal walls defined by the strips, such that each cell is, in effect, a channel having an entrance 26 and exit 28 (vertically aligned and therefore indistinguishable in FIG. 1), and four corners 30 associated with each entrance 26 and exit 28. These corners 30 are at the intersection 32 of the row strips 16 and column strips 18, and are the location at which weld deposits 34 rigidly join the strips. The end edges 36 of each strip 14 are welded to the perimeter plates 12 to assure overall rigidity of the grid.

FIRST EMBODIMENT

Figure 4:
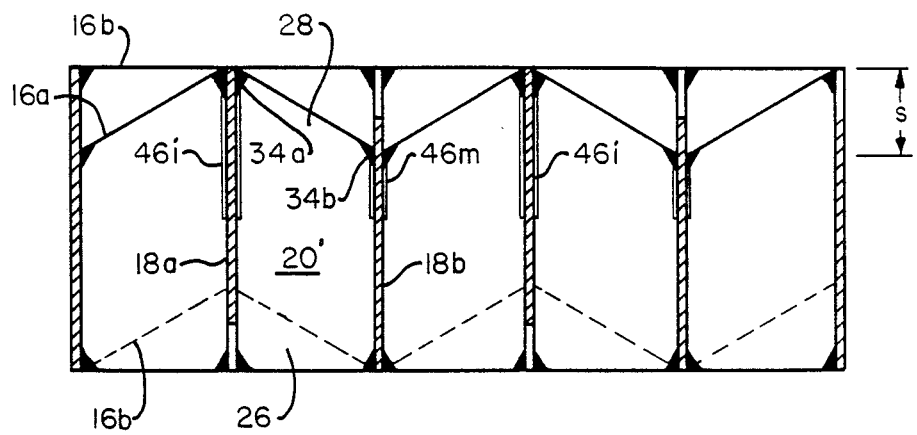
FIG. 4 is an elevation section view taken along line 4—4 of FIG. 1, showing the staggered weld elevations in accordance with the first embodiment of the invention.

FIGS. 2, 3, and 4 show two kinds and four orientations of grid strips 14 constituting the array shown in FIG. 1. In this first embodiment of the present invention, at the entrance 26 and exit 28 of any cell 20', one of the four corners 30 is at a different elevation, thereby reducing the pressure drop through the cell relative to conventional welding techniques wherein all four welds at an entrance or exit are in the same plane.

Figure 2B:
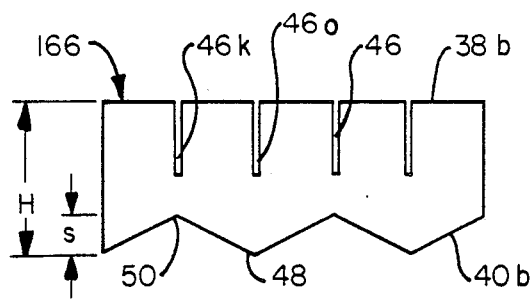
FIGS. 2(a) and 2(b) are elevation views of alternating row strip members of the grid shown in FIG. 1, showing linear lower and saw-toothed upper edges on one strip and linear upper and saw-toothed lower edges on the other strip, respectively, in accordance with a first embodiment of the invention.
Figure 2A:
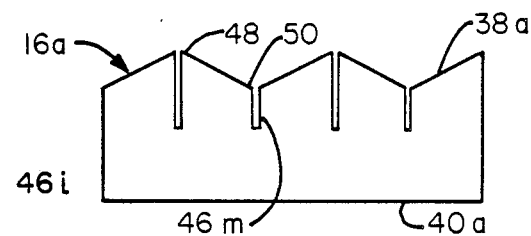
Figure 3A:
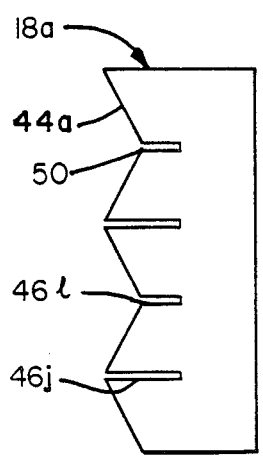
FIGS. 3(a) and 3(b) show the column strip members of the grid of FIG. 1, which mate with the row strips shown in FIGS. 2a(a) and 2(b)
Figure 3B:
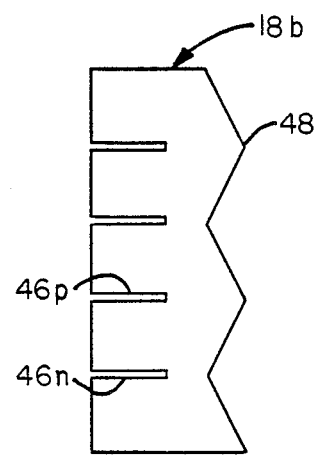

The row strips 16a, 16b shown in FIG. 2 alternate between the front and back of the grid. Each has a non-linear edge, strip 16a having a saw-toothed upper edge 38a and strip 16b having a saw-toothed lower edge 40b. The respective lower and upper edges 40a, 38b are substantially linear. "Substantially linear" in the context of the present invention includes the grid strip edges shown in the above-identified U.S. patents. Each strip has vertically oriented, spaced apart slots 46 by which the intersection 32 with the mating column strips 18 is accomplished. In FIGS. 2(a) and 2(b), it may be seen that the total height H of each strip 16a, 16b is the same, as is the saw-tooth amplitude S. The location of each slot is coincident with, or vertically aligned with, the maxima 48 and minima 50 of the saw-tooth portion of each strip. In FIGS. 3(a) and 3(b), the two types of column strips 18a, 18b, are identical to, but oriented differently, than, the row strips 16a and 16b respectively, each having one linear edge and one saw-toothed edge.

When the four strips illustrated in FIGS. 2 and 3 are assembled, slot 46i mates with slot 46j, slot 46k mates 46l, slot 46m mates with 46n, and slot 46o mates with slot 46p, etc. It may thus be appreciated, that in this embodiment, the slots 46i in the saw-tooth maxima 48 of the upper edge 38a of row strip 16a mate with the slots 46j in the saw-tooth maxima on the lower edge 44a of column strip 18a. The slots 46k on the straight or linear edge opposite saw-tooth minima 50, on row strip 16b mate with slots 46l on column strip 18a, located at the saw-tooth minima 50. The slots 46o on the linear edge opposite the saw-tooth maxima, mate with similar slots 46p opposite the saw-tooth maxima on the perpendicularly oriented strips.

FIG. 4 is a section view taken along line 4—4 of FIG. 1, showing the resulting relationship of the edges and corners of the grid strips associated with the first embodiment of the invention represented in FIGS. 2 and 3. Strip 16a is in the foreground and 16b is behind; the lower, saw-tooth portion of strip 16b is shown in phantom. Column strips 18a and 18b project into and out of the plane of the drawing. It may be seen that the weld deposits 34 associated with the flow exit 28 of the grid are at two distinct elevations, and likewise the weld deposits associated with the flow entrances 26 to the grid, are at different elevations. For example, in cell 20', three welds 34a (shown), 34c and 34d (on plate 12, FIG. 1), are at the same elevation, whereas weld 34b is at a distance S below the others.

SECOND EMBODIMENT

Figure 5:
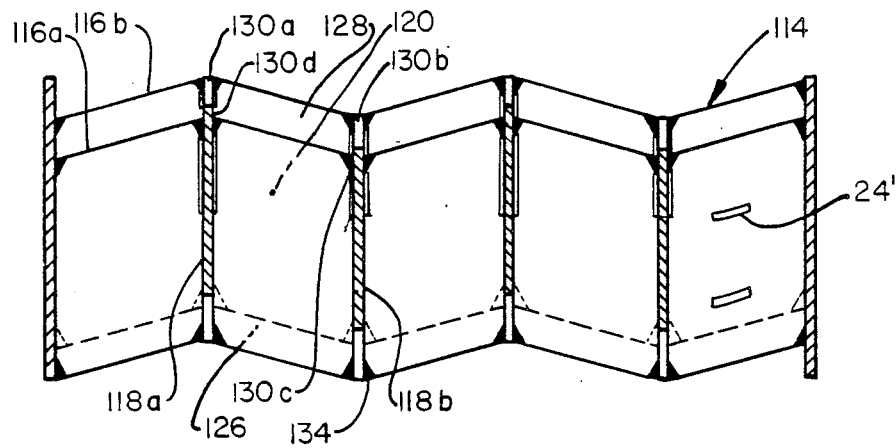
FIG. 5 is a sectioned elevation view similar to that of FIG. 4, showing a second embodiment of the invention in which both the row and column grid strips have saw-toothed upper and lower edges.
Figure 6:
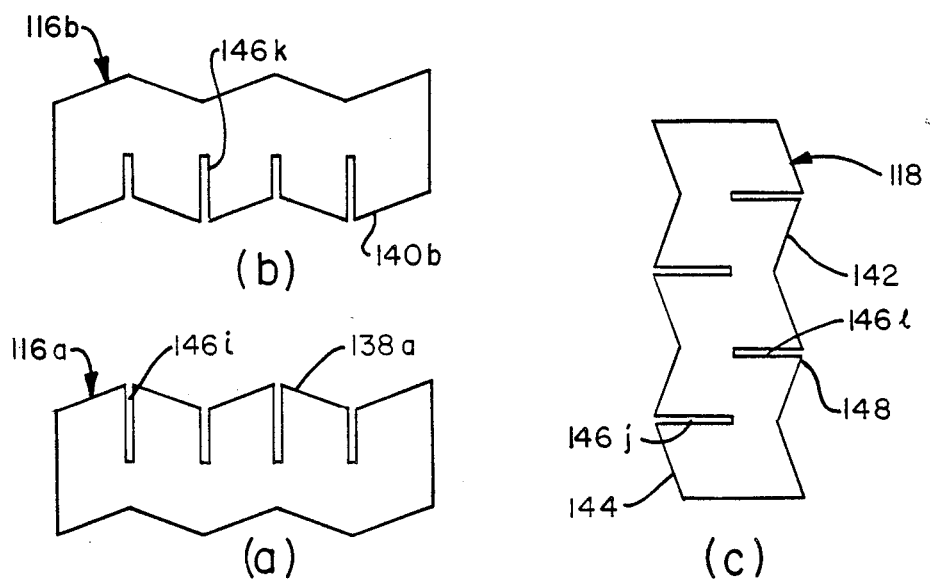
FIGS. 6(a), 6(b) and 6(c) are elevation views of the row and column strips in accordance with the second embodiment of the invention illustrated in FIG. 5.
Figure 7:
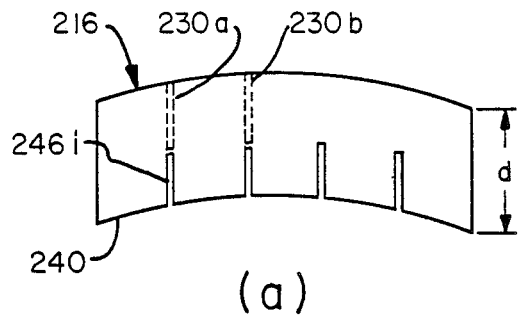
Figure 7:
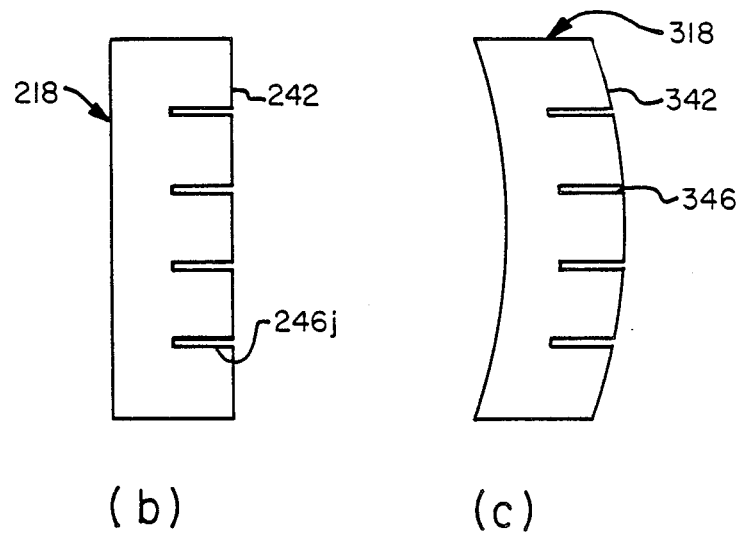

FIGS. 5 and 6 illustrate a second embodiment of the invention, in which each of the welds at the entrance 126 and exit 128 of a particular cell or channel e.g., 120, is at a different elevation. In this embodiment which also appears as FIG. 1 from above, each row and column strip 114 has saw-toothed upper and lower edges. The row type of strip 116 is oriented in a first row 116a wherein the slots 146 are all located at the upper edge 138a of the strip, and reoriented in a second row strip 116b in which the slots 146k are all located at the lower edge 140b, with the rows alternating front-to-back between the row strips 116a, 116b. The column strips 118 are all similarly disposed however, having slots 146j, 146l which alternate between the upper and lower edges, 142, 144, at the saw-tooth maxima 148.

In this embodiment, each cell exit 128 (or entrance 126), has the four welds 134 at a different elevation as shown in FIG. 5. Corner 130a is formed at a maximum of both a row strip 116b and column strip 118a, corner 130b is formed at a maximum of a column strip 118b but at a minimum of a row strip 116a, corner 130c is at a minimum of a column strip 118b and a row strip 116b, and corner 130d is at a maxiumum of a row strip 116a and a minimum of a column strip 118a. This pattern of different weld elevations is also evident (in phantom) at the corners at the entrance 126 of cell 120.

As a further means for reducing the cross-sectional area of structural material at any given plane or elevation within a cell, the springs or arches 24' may be slanted as shown in FIG. 5.

It should be appreciated that other particular embodiments of the present invention may be successfully implemented without departing from the scope of the claims as set forth below. For example, it may be found that weld deposits are not necessary at every intersection in all cell entrances and exits. As a practical matter, welds are made at an intersection such that four corner welds are formed simultaneously, one for each of four contiguous cells. Half the strip intersections on the upper and lower sides of the grid could be welded, alternating in a checkerboard pattern. This option may be particularly attractive where the maximum grid strength is not needed, but the flow resistance must be kept low. Furthermore, the inherent strength of the non-linear grids in resisting compressive loads without buckling, may also give greater flexibility in omitting welds from some cell corners or strip intersections.

I claim:

1. A nuclear fuel assembly grid comprising:
  a plurality of elongated, perpendicularly intersecting strips rigidly joined to form rows and columns of vertical cells, each cell having entry and exit openings;
  each of said strips having upper and lower edges, at least one of said upper or lower edges having a plurality of spaced-apart slots, each slot engaging a mating slot on a perpendicularly oriented strip, such that at each strip intersection, the upper edges of the intersecting strips are at substantially the same elevation to form a cell exit corner and the lower edges of the intersecting strips are at another elevation to form a cell entrance corner:

each of the row-oriented strips having at least one nonlinear saw-toothed upper or lower edge such that at least one of the corners in each cell entrance and exit is at a different elevation from the other corners of said entrance or exit; and at least half of all said corners include weld material joining the intersecting strips.

2. The fuel assembly grid of claim 1 wherein all the column-oriented strips have at least one non-linear saw-toothed lower or upper edge.

3. The fuel assembly grid of claim 2 wherein each non-linear upper and lower edge saw-toothed maxima and minima coincide with a cell corner.

4. The fuel assembly grid of claim 3 wherein the row-oriented strips are of two alternating types, one having linear lower and saw-toothed upper edges, and the other having saw-toothed lower and linear upper edges.

5. The fuel assembly grid of claim 4 wherein all corners are welded.

* * * * *